(12) United States Patent
Urakami et al.

(10) Patent No.: US 7,300,497 B2
(45) Date of Patent: Nov. 27, 2007

(54) GAS SEPARATING METHOD

(75) Inventors: Tatsushi Urakami, Tsukuba (JP);
Tooru Nagasaka, Tsuchiura (JP);
Masato Kawai, Yokohama (JP);
Akihiro Nakamura, Kofu (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 421 days.

(21) Appl. No.: 10/510,745

(22) PCT Filed: Apr. 11, 2003

(86) PCT No.: PCT/JP03/04655

§ 371 (c)(1),
(2), (4) Date: Oct. 12, 2004

(87) PCT Pub. No.: WO03/086586

PCT Pub. Date: Oct. 23, 2003

(65) Prior Publication Data

US 2005/0199122 A1    Sep. 15, 2005

(30) Foreign Application Priority Data

Apr. 15, 2002    (JP) .............................. 2002-112145

(51) Int. Cl.
*B01D 53/047* (2006.01)
(52) U.S. Cl. .............................. 95/98; 95/100; 95/103; 95/127; 95/130
(58) Field of Classification Search .............. 95/96, 95/97, 98, 100, 103, 127, 130
See application file for complete search history.

(56) References Cited

U.S. PATENT DOCUMENTS

| | | | |
|---|---|---|---|
| 3,788,036 A | 1/1974 | Lee et al. | |
| 4,190,424 A | 2/1980 | Armond et al. | |
| 4,661,125 A | 4/1987 | Haruna et al. | |
| 4,917,710 A | 4/1990 | Haruna et al. | |
| 5,104,426 A * | 4/1992 | Yamada et al. | 95/11 |
| 5,833,737 A | 11/1998 | Tamura et al. | |
| 2003/0000385 A1 * | 1/2003 | Kawai et al. | 95/96 |

FOREIGN PATENT DOCUMENTS

| | | |
|---|---|---|
| EP | 163242 | 12/1985 |
| EP | 334495 | 9/1989 |
| EP | 0813 211 A | 12/1997 |
| FR | 2.193.643 | 7/1973 |

(Continued)

*Primary Examiner*—Robert A. Hopkins
(74) *Attorney, Agent, or Firm*—Nixon & Vanderhye P.C.

(57) ABSTRACT

A gas separation method is provided in which, when separating a first component and a second component from a mixed gas containing a plurality of components by using a pressure swing adsorption method, these components can be efficiently recovered and cost reduction can be achieved. Between an adsorption step and a regeneration process step, which use a first adsorption column containing a first adsorbent on which the first component is less readily adsorbable and the second component is absorbable, and a second adsorption column containing a second adsorbent on which the first component is readily adsorbable and the second component is less readily adsorbable, an equalization depressurization step and an equalization pressurization process step, in which the pressure of the first and second adsorption columns is equalized, is carried out.

6 Claims, 5 Drawing Sheets

FOREIGN PATENT DOCUMENTS

| | | |
|---|---|---|
| JP | 49-64569 | 6/1974 |
| JP | 60-246206 | 12/1985 |
| JP | 1-184016 | 7/1989 |
| JP | 01184016 * | 7/1989 |
| JP | 1-236914 | 9/1989 |
| JP | 2000-241590 | 9/2000 |
| JP | 2001-116836 | 4/2001 |
| JP | 2002-126435 | 5/2002 |
| JP | 2002-306918 | 10/2002 |

* cited by examiner

FIG. 1

FIG. 2A (STEP 1)
FIRST ADSORPTION COLUMN 11;
ADSORPTION PROCESS
SECOND ADSORPTION COLUMN 21;
REGENERATION PROCESS

FIG. 2B (STEP 2)
FIRST ADSORPTION COLUMN 11;
PRESSURE EQUALIZING
AND DEPRESSURIZING PROCESS
SECOND ADSORPTION COLUMN 21;
PRESSURE EQUALIZING
AND PRESSURIZING PROCESS

FIG. 2C (STEP 3)
FIRST ADSORPTION COLUMN 11;
REGENERATION PROCESS
SECOND ADSORPTION COLUMN 21;
ADSORPTION PROCESS

FIG. 2D (STEP 4)
FIRST ADSORPTION COLUMN 11;
PRESSURE EQUALIZING
AND PRESSURIZING PROCESS
SECOND ADSORPTION COLUMN 21;
PRESSURE EQUALIZING
AND DEPRESSURIZING PROCESS

(STEP 1)
FIRST ADSORPTION COLUMN 11;
ADSORPTION PROCESS
SECOND ADSORPTION COLUMN 21;
REGENERATION PROCESS

FIG. 4B

(STEP 2)
FIRST ADSORPTION COLUMN 11;
PRESSURE EQUALIZING
AND DEPRESSURIZING PROCESS
SECOND ADSORPTION COLUMN 21;
PRESSURE EQUALIZING
AND PRESSURIZING PROCESS

FIG. 4C (STEP 3)
FIRST ADSORPTION COLUMN 11;
REGENERATION PROCESS
SECOND ADSORPTION COLUMN 21;
ADSORPTION PROCESS

FIG. 4D (STEP 4)
FIRST ADSORPTION COLUMN 11;
PRESSURE EQUALIZING
AND PRESSURIZING PROCESS
SECOND ADSORPTION COLUMN 21;
PRESSURE EQUALIZING
AND DEPRESSURIZING PROCESS

GAS SEPARATING METHOD

This application is the U.S. national phase of international application PCT/JP03/04655, filed 11 Apr. 2003, which designated the U.S. and claims priority to JP Application No. 2002-112145 filed 15 Apr. 2002. The entire contents of these applications are incorporated herein by reference.

The present invention relates to a method of separating components from a mixed gas containing at least two components, for example a noble gas and nitrogen, using a pressure swing adsorption method.

The present application is based upon Japanese Patent Application No. 2002-112145, the content of which is incorporated into the present specification.

BACKGROUND ART

In the process of manufacturing semiconductor products such as a semiconductor integrated circuit, a liquid crystal panel, a solar panel or a magnetic disk, there has been used an apparatus for generating plasma in a noble gas atmosphere in order to carry out various processes for semiconductor device by the plasma.

In this plasma process, the noble gas is introduced into a process chamber in a nitrogen atmosphere in order to generate plasma by high-frequency discharge, and when the processed product is taken out, the chamber is purged by charging nitrogen.

Although argon was conventionally used as the noble gas to be employed in such treatments, recently, krypton and xenon are coming to the fore for more sophisticated applications.

However, krypton and xenon are extremely expensive, since the existence ratio of them in air is very small and the process of separating them from air is complicated. Therefore, there has been a problem that the cost for krypton and xenon rises dramatically if these gases are used as the atmosphere gas for the process and exhausted (wasted) to outside.

In order to economically establish the process using these noble gases, it is important to recover the noble gas from the exhaust gas at a high recovery rate and reuse it.

In order to reuse the noble gas, it is necessary to separate noble gas with an impurity concentration of 100 ppm or less from the exhaust gas.

As a method of separating a desired component from a mixed gas containing a plurality of components, a pressure swing adsorption method is available.

This pressure swing adsorption method is applicable to a method of recovering noble gas from the above mentioned exhaust gas.

In a conventional pressure swing adsorption method, when a readily adsorbable component is adsorbed onto an adsorbent during an adsorption step, a less readily adsorbable component is also slightly adsorbed at the same time.

Furthermore, since the less readily adsorbable component remains in the interparticle void space in an adsorption column, an exhaust gas containing a large amount of the less readily adsorbable component is exhausted to outside the system during a regeneration step. Therefore, it is difficult to recover the desired gas at high recovery rate (less readily adsorbable component in this example).

In order to recover the desired component from the mixed gas at a high recovery rate, it is indispensable to maintain the amount of the desired component contained in the gas exhausted to outside the system at a minimum.

As conventional pressure swing adsorption methods, there are a rate-dependent pressure swing adsorption method, which uses the difference in adsorption rates of adsorbed gases, and an equilibrium pressure swing adsorption method, which uses the difference in the amounts of adsorbed gases at equilibrium. It is possible to improve the recovery rate by combining these methods.

In case combining these two separation methods, for example, the gases discharged during the regeneration steps of the rate-dependent pressure swing adsorption process and the equilibrium pressure swing adsorption process are all recovered in a feed gas storage tank, mixed with a feed gas, and recirculated during the adsorption steps as a circulating feed gas.

In this method, since the gas discharged during the regeneration step are supplied to adsorption columns during the adsorption step, the amount of the desired component that is exhausted to outside the system can be suppressed.

In case simply combining two separation methods, two adsorption columns are respectively needed in the equilibrium pressure swing adsorption process and the rate-dependent pressure swing adsorption process, that is, four adsorption columns in total.

Correspondingly, in case using the gas separation method that the gas to be separated is alternately introduced into first and second adsorption columns that are containing adsorbents having different adsorption characteristics (equilibrium type adsorbent and rate-selective adsorbent) respectively, the apparatus will be a lower capital cost.

Hereinafter, the method for separating one less readily adsorbable component from a feed gas at the first adsorption column by using an equilibrium pressure swing adsorption method and separating another less readily adsorbable component from the feed gas at the second adsorption column by using a rate-dependent pressure swing adsorption method is described.

During the adsorption steps in the first and second adsorption columns, a circulating feed gas is introduced into the adsorption column at a high pressure, and a readily adsorbable component is selectively adsorbed on the respective adsorbent, and a less readily adsorbable component is extracted as product gas.

During the regeneration steps, by depressurizing the adsorption column, the readily adsorbable component adsorbed onto the adsorbent is desorbed, and the adsorbent is regenerated. The discharge gas is mixed with a feed gas, and supplied to the adsorption column during the adsorption steps as the circulating feed gas.

In this method, as shown in Table 1, the first adsorption column is undergoing the adsorption step, while the second adsorption column is undergoing the regeneration step, and conversely, the second adsorption column is undergoing the adsorption step, while the first adsorption column is undergoing the regeneration step.

With this method, each adsorption column used for each pressure swing adsorption process can be made to be one.

TABLE 1

| First adsorption column | Adsorption step | Regeneration step |
|---|---|---|
| Second adsorption column | Regeneration step | Adsorption step |

However, since the method mentioned above cannot achieve an adequate product recovery rate, it has been desired that this recovery rate be improved. Here, the product recovery refers to the ratio of the product gas flow rate to the circulating feed gas flow rate, which is defined as follows.

Product recovery rate [%]=(product gas flow rate× product gas concentration [%])/(circulating feed gas flow rate/2× concentration of product gas [%] within circulating feed gas)×100

Since the conventional method achieved a low product recovery rate, a compressor having a large capacity was needed, and there has been an issue of an increase in facility cost and operation cost.

DISCLOSURE OF INVENTION

The present invention takes into consideration the circumstances outlined above, with an object of providing a gas separation method in which, when separating components from a mixed gas containing a plurality of components by using the pressure swing adsorption method, these components can be efficiently recovered and cost reduction can be achieved.

The gas separation method of the present invention is characterized in that by using a first adsorption column containing a first adsorbent on which a first component is less readily adsorbable and a second component is more readily adsorbable, and a second adsorption column containing a second adsorbent on which the first component is more readily adsorbable and the second component is less readily adsorbable, the first component and the second component are separated by;

(Step 1)
the first adsorption column is undergoing an adsorption step wherein the mixed gas is provided at a high pressure and the second component is selectively adsorbed and the first component is separated as a first product gas, while the second adsorption column is undergoing a regeneration step wherein the first component is desorbed by depressurization, (Step 2)
the first adsorption column is undergoing an equalization depressurization step wherein the first adsorption column is depressurized by introducing the gas in the first adsorption column into the second adsorption column to equalize the pressure of these adsorption columns, while the second adsorption column is undergoing an equalization pressurization step wherein the second adsorption column is pressurized by the introduction of the gas from the first adsorption column, (Step 3)
the first adsorption column is undergoing a regeneration step wherein the second component is desorbed by depressurization, while the second adsorption column is undergoing an adsorption step wherein the mixed gas is provided at a high pressure, and the first component is selectively adsorbed, and the second component is extracted as a second product gas, (Step 4)
the second adsorption column is undergoing an equalization depressurization step wherein the second adsorption column is depressurized by introducing the gas in the second adsorption column into the first adsorption column to equalize the pressure of these adsorption columns, while the first adsorption column is undergoing an equalization pressurization step wherein the first adsorption column is pressurized by the introduction of the gas from the second adsorption column, The gas separation method of the present invention allows a method in which a first and a second product storage tank that stores the first and the second product gas are used, and during the regeneration steps, each product gas in the first and the second product storage tank is introduced into the first and the second adsorption column respectively, and during the equalization pressurization step, each product gas in the first and the second product storage tank is introduced into the first and the second adsorption column respectively.

In the gas separation method of the present invention, preferably a first and a second purge gas storage tank that stores the gas extracted from the first and the second adsorption column as purge gas, and during the equalization depressurization step, the gas in the first and the second adsorption column is stored into the first and the second purge gas storage tank respectively as purge gas, and during the regeneration step, the purge gas in the first and the second purge gas storage tank is introduced into the first and the second adsorption column respectively.

In the gas separation method of the present invention, one of the first and second components may be krypton or xenon, and the other one may be nitrogen.

In the gas separation method of the present invention, one of the first and second adsorbents may be an equilibrium type adsorbent, and the other one may be a rate-selective adsorbent.

In the gas separation method of the present invention, one of the first and second adsorbents may be activated carbon, and the other one may be zeolite.

In the gas separation method of the present invention, in the adsorption column containing the rate-selective adsorbent, preferably a maximum pressure reached during the adsorption step is 300 to 500 kPa (gauge pressure).

BEST MODE FOR CARRYING OUT THE INVENTION

Figure 1:
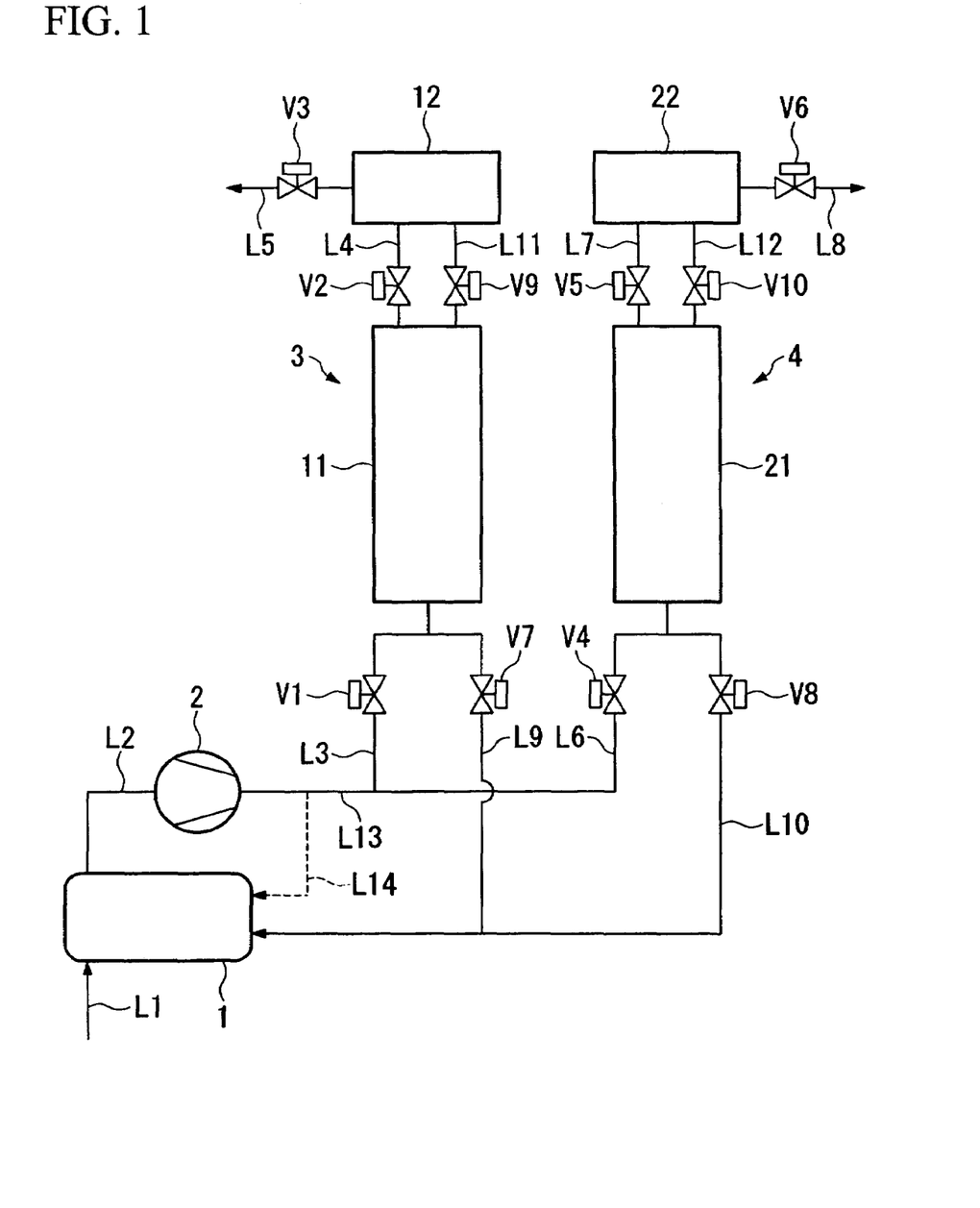
FIG. 1 is a schematic diagram showing a gas separation apparatus that can carry out a first embodiment of the gas separation method of the present invention.

FIG. 1 is a schematic diagram showing a gas separation apparatus that can carry out a first embodiment of the gas separation method of the present invention.

This gas separation apparatus consists of: a feed gas storage tank 1 into which a feed gas containing at least two components is introduced; a compressor 2 that compresses a circulating feed gas from the feed gas storage tank 1; a first separation unit 3 that separates a first component in the circulating feed gas from the compressor 2 as a first product gas; and a second separation unit 4 that separates a second component in the circulating feed gas as a second product gas.

The first separation unit 3 has a first adsorption column 11 that separates the first component in the circulating feed gas as the first product gas, and a first product gas storage tank 12 that stores the first product gas.

Reference symbol L3 denotes an introduction line that introduces the circulating feed gas from the compressor 2 into the first adsorption column 11. The introduction line L3 is connected to the bottom end of the first adsorption column 11.

Reference symbol L4 denotes a line that has a function of introducing the first product gas from the first adsorption column 11 into the first product gas storage tank 12, and a function of returning the first product gas from the tank 12 to the adsorption column 11. The line L4 is connected to the top end of the first adsorption column 11.

Reference symbol L5 denotes a delivery line that delivers the first product gas from the tank 12.

Reference symbol L9 denotes a return line that returns a discharge gas from the first adsorption column 11 to the feed gas storage tank 1.

Reference symbol L11 denotes an introduction line that introduces the first product gas in the first product gas storage tank 12 into the first adsorption column 11 as purge gas.

A first adsorbent on which the first component is less readily adsorbable and the second component is more readily adsorbable is used for the first adsorption column 11.

The second separation unit 4 has a second adsorption column 21 that separates the second component in the circulating feed gas as the second product gas, and a second product gas storage tank 22 that stores the second product gas.

Reference symbol L6 denotes an introduction line that introduces the circulating feed gas from the compressor 2 into the second adsorption column 21. The introduction line L6 is connected to the bottom end of the second adsorption column 21.

Reference symbol L7 denotes a line that has a function of introducing the second product gas from the second adsorption column 21 into the second product gas storage tank 22, and a function of returning the second product gas from the tank 22 to the adsorption column 21. The line L7 is connected to the top end of the second adsorption column 21.

Reference symbol L8 denotes a delivery line that delivers the second product gas from the tank 22.

Reference symbol L10 denotes a return line that returns a discharge gas from the second adsorption column 21 to the feed gas storage tank 1.

Reference symbol L12 denotes an introduction line that introduces the second product gas in the second product gas storage tank 22 into the second adsorption column 21 as purge gas.

A second adsorbent on which the second component is less readily adsorbable and the first component is more readily adsorbable is used for the second adsorption column 21.

Hereinafter, a first embodiment of the gas separation method of the present invention will be explained as an example of the case in which the above mentioned gas separation apparatus is used.

In the gas separation method of the present embodiment an example is given for a case in which the feed gas that includes nitrogen as the first component and krypton as the second component is taken as the object of separation.

It is preferable to use activated carbon, which is an equilibrium type adsorbent, as the first adsorbent with which the first adsorption column 11 is filled. Activated carbon has characteristics such that, which is an equilibrium type adsorbent, it has a large adsorbed amount for krypton (more readily absorbable) and it has small adsorbed amount for nitrogen (less readily absorbable).

It is preferable to use zeolite 4A (Na-A type zeolite), which is a rate-selective adsorbent, as the second adsorbent with which the second adsorption column 21 is filled.

Zeolite 4A has characteristics such that krypton, which has a comparatively large molecular size, is difficult to be adsorbed (less readily absorbable), and nitrogen, which has a molecular size smaller than that of krypton, is adsorbed easily (more readily absorbable).

This characteristic is generally called a rate-selective type, and if an appropriate adsorption time is selected, it is possible to selectively adsorb nitrogen and to withdraw krypton from the adsorption column without adsorbing krypton.

(Step 1)

The above mentioned mixed gas as a feed gas is introduced into the feed gas storage tank 1 via the path L1.

Figure 2A:
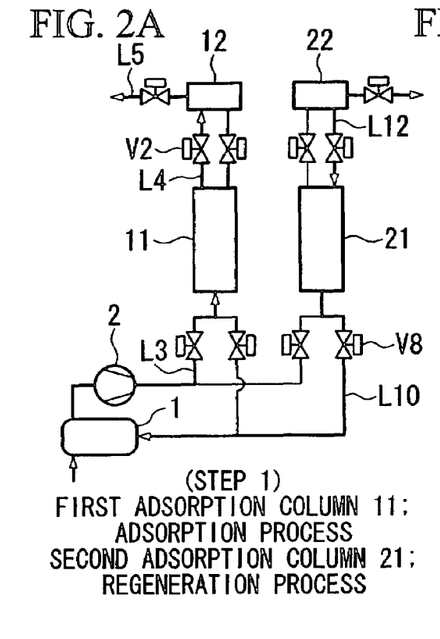
FIG. 2A to D is a flow chart of the first embodiment of the gas separation method of the present invention.

As shown in FIG. 2A, in the first adsorption column 11, an adsorption step is carried out in which krypton is adsorbed and nitrogen is separated as the first product gas.

During this adsorption step, the circulating feed gas from the feed gas storage tank 1 is compressed by the compressor 2 and supplied to the first adsorption column 11 via the path L3.

By pressurizing the first adsorption column 11 with the supply of circulating feed gas, krypton, which is readily adsorbable on the first adsorbent, is adsorbed, and less readily adsorbable nitrogen is passed via the path L4 and introduced into the first product gas storage tank 12.

The nitrogen gas in the first product gas storage tank 12 is delivered out of the system via the path L5, as the first product gas.

During this adsorption step, preferably the circulating feed gas is supplied to the adsorption column 11, with a valve V2 kept closed until the pressure of adsorption column 11 rises above that of the tank 12, and the valve V2 is opened at the time when the pressure of adsorption column 11 rises above that of the tank 12, and the gas in the adsorption column 11 is introduced into the tank 12 via the path L4.

Furthermore, a line (not shown in the diagram) that connects the adsorption column 11 and tank 12 may be provided, and a check valve may be provided in this line, so that the gas in the adsorption column 11 is introduced into the tank 12 through this line at the time when the pressure of adsorption column 11 rises above that of the tank 12.

In the second adsorption column 21, a regeneration step is carried out in which the nitrogen gas is desorbed by depressurization.

During this regeneration step, by opening a valve V8, the nitrogen gas that has been adsorbed during the adsorption step carried out prior to step 1 is desorbed and returned to the feed gas storage tank 1 via the path L10 as discharge gas. In this way, the second adsorbent is regenerated.

At the same time, the krypton gas in the second product gas storage tank 22 is introduced into the second adsorption column 21 via the path L12, and this krypton gas is passed through the second adsorption column 21, so that desorption of the nitrogen gas that has been adsorbed onto the second adsorbent is accelerated.

During step 1, the gas (discharge gas and so forth) that is returned from the adsorption column 21 (adsorption column 11 in step 3) and the feed gas that is introduced from the line L1 are introduced into the feed gas storage tank 1.

Thus, a circulating feed gas that is a mixed gas of the returned gas from the adsorption column 21 (adsorption column 11 in step 3) and the feed gas, is supplied to the first adsorption column 11 (second adsorption column 21 in step 3).

(Step 2)

Figure 2B:
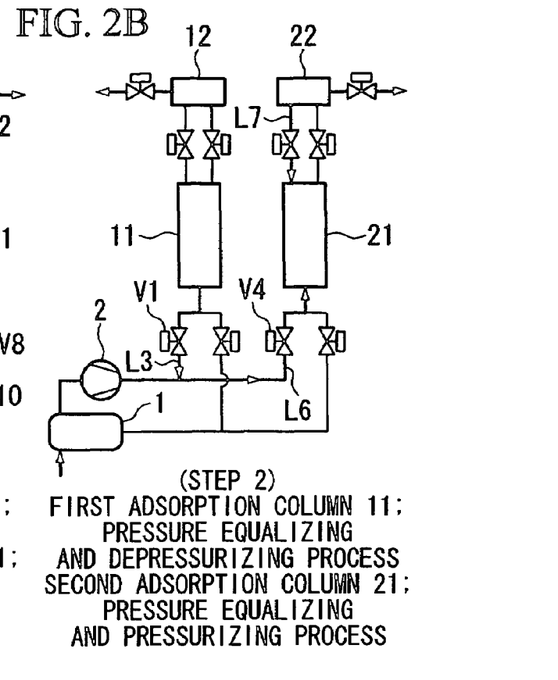

As shown in FIG. 2B, in the first adsorption column 11, an equalization depressurization step is carried out in which the first adsorption column 11 is depressurized by introducing the gas in the adsorption column 11 into the second adsorption column 21 to equalize the pressure of the adsorption columns 11 and 21.

During this equalization depressurization step, by opening valves V1 and V4, the first adsorption column 11 and the second adsorption column 21 are connected by the lines 13 and L6.

Since the pressure of the first adsorption column 11 has been high due to step 1 (adsorption step) and the pressure of the second adsorption column 21 has been low due to step 1 (regeneration step), the gas in the first adsorption column 11 is introduced into the second adsorption column 21 through the lines L3 and L6, and the first adsorption column 11 is depressurized. Therefore the adsorption columns 11 and 21 are pressure equalized.

During step 2, an equalization pressurization step is carried out in which the first adsorption column 11 is depressurized and the krypton gas that has been adsorbed onto the first adsorbent is desorbed and introduced into the second adsorption column 21 so that the second adsorption column 21 is pressurized.

During this equalization pressurization step, the krypton gas from the second product gas storage tank 22 is introduced into the second adsorption column 21 through the line L7, while the gas from the first adsorption column 11 is introduced into the second adsorption column 21. In this way, the second adsorption column 21 is pressurized.

During step 2 (the equalization depressurization step of the first adsorption column 11 and the equalization pressurization step of the second adsorption column 21), the supply of the circulating feed gas is continued without stopping the operation of the compressor 2. This circulating feed gas is supplied to the second adsorption column 21 via the path L6 together with the above mentioned gas that is introduced into the adsorption column 21 from the adsorption column 11.

In the shift from step 1 to step 2, the destination of introduction for the circulating feed gas changes from the first adsorption column 11 to the second adsorption column 21. However since the second adsorption column 21 is pressurized due to the introduction from first adsorption column 11 during step 2, there is no great fluctuation in the operation load on the compressor 2.

(Step 3)

Figures 2C, 2D:
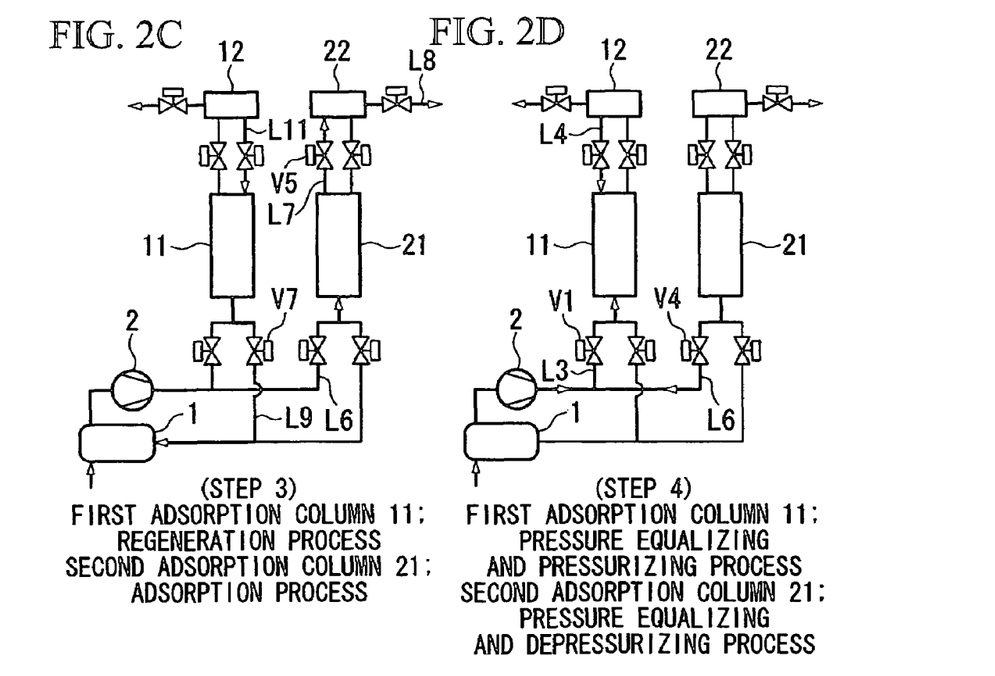

As shown in FIG. 2C, a regeneration step in which krypton gas is desorbed by depressurizing is carried out in the first adsorption column 11.

During this regeneration step, by opening the valve V7 the krypton gas that has been adsorbed during step 1 is desorbed and returned to the feed gas storage tank 1 via the path L9 as discharge gas. In this way, the first adsorbent is regenerated.

At the same time, the nitrogen gas in the first product gas storage tank 12 is introduced into the first adsorption column 11 via the path L11, and this nitrogen gas is passed through the first adsorption column 11, so that desorption of the krypton gas that has been adsorbed onto the first adsorbent is accelerated.

In the second adsorption column 21, an adsorption step is carried out in which nitrogen is adsorbed and krypton is separated as the second product gas.

During this adsorption step, the circulating feed gas from the feed gas storage tank 1 is compressed by the compressor 2 and supplied to the second adsorption column 21 via the path L6.

By pressurizing the second adsorption column 21 with the supply of circulating feed gas, the nitrogen gas, which is more readily adsorbable on the second adsorbent, is selectively adsorbed, and the less readily adsorbable krypton gas is passed through the line L7 and introduced into the second product gas storage tank 22.

The krypton gas in the second product gas storage tank 22 is delivered out of the system via the path L8 as the second product gas.

In the second adsorption column 21, the maximum pressure during the adsorption step, (hereinafter referred to as adsorption pressure), is preferably set to be within the range of 300-500 kPa (gauge pressure).

With a pressure swing adsorption method, since the adsorbed amount for each unit adsorbent increases as the adsorption pressure is increased, impurity concentrations in the product gas can be reduced by having this pressure at 300 kPa (gauge pressure) or above. Consequently, the amount of adsorbent can be suppressed to a minimum and cost reduction achieved.

Furthermore, when the adsorption pressure is set above 500 kPa (gauge pressure), since the flow of the circulating feed gas supplied to the adsorption column 21 needs to be raised, the power consumption of the compressor 2 increases.

In particular, when separating high purity krypton gas (around 99.99%), unlike with a normal pressure swing adsorption method, the operation of raising the adsorption pressure does not necessarily increase the product gas purity.

If the adsorption pressure is set to a value above 500 kPa (gauge pressure), it results in the impurities in the product gas increasing, leading to an increase in the amount of adsorbent and a decrease in product recovery rate.

Therefore, by configuring the adsorption pressure within the range of 300-500 kPa (gauge pressure), facility cost and operation cost can be kept low without decreasing the product recovery rate.

During this adsorption step, preferably the circulating feed gas is supplied to the adsorption column 21, with a valve V5 kept closed until the pressure of adsorption column 21 rises above that of the tank 22, and the valve V5 is opened at the time when the pressure of adsorption column 21 rises above that of the tank 22, and the gas in the adsorption column 21 is introduced into the tank 22 via the path L7.

Furthermore, a line (not shown in the diagram) that connects the adsorption column 21 and tank 22 may be provided, and a check valve may be provided on this line, so that the gas in the adsorption column 21 is introduced into the tank 22 through this line at the time when the pressure of adsorption column 21 rises above that of the tank 22.

(Step 4)

As shown in FIG. 2D, an equalization depressurization step is carried out in which the second adsorption column 21 is depressurized by introducing the gas in the second adsorption column 21 into the first adsorption column 11 to equalize the pressure of the adsorption columns 11 and 21.

During this equalization depressurization step, by opening valves V1 and V4, the first adsorption column 11 and the second adsorption column 21 are connected by the lines L3 and L6.

Since the pressure of the first adsorption column 11 has been low due to step 3 (regeneration step) and the pressure of the second adsorption column 21 has been high due to step 3 (adsorption step), the gas in the second adsorption column 21 is introduced into the first adsorption column 21 via the paths L6 and L3, and the second adsorption column 21 is depressurized. Therefore the adsorption columns 11 and 21 are pressure equalized.

During step 4, an equalization pressurization step is carried out in which the second adsorption column 21 is depressurized and the nitrogen gas that has been adsorbed onto the second adsorbent is desorbed and introduced into the first adsorption column 11 so that the first adsorption column 11 is pressurized.

During this equalization pressurization step, the nitrogen gas in the first product gas storage tank 12 is introduced into the first adsorption column 11 via the path L4, while the gas from the second adsorption column 21 is introduced into the first adsorption column 11. In this way, the first adsorption column 11 is pressurized.

During step 4 (equalization depressurization step of the second adsorption column 21 and equalization pressurization step of the first adsorption column 11), the supply of the circulating feed gas is continued without stopping the operation of the compressor 2. This circulating feed gas is supplied to the first adsorption column 11 via the path L3 together with the above mentioned gas that is introduced into the adsorption column 11 from the adsorption column 21.

In the shift from step 3 to step 4, the destination of introduction for the circulating feed gas changes from the second adsorption column 21 to the first adsorption column 11. However since the first adsorption column 11 is pressurized due to the introduction from second adsorption column 21 during step 4, there is no great fluctuation in the operation load on the compressor 2.

In this gas separation method, the separation of the components from the feed gas can be continuously carried out by repeating the above mentioned steps 1 to 4.

In general, the cycle time in a pressure swing adsorption method (the time that is required for one series of steps; in the embodiment mentioned above, the time that is required from step 1 to step 4) is an important parameter that has a great influence on the product recovery rate and the amount of absorbent.

When compared under the conditions where the operating pressure of the pressure swing adsorption method (adsorption pressure and regeneration pressure) and the amounts of adsorbent are constant, the cycle time can be shortened by enhancing the capacity of the compressor and increasing the flow of the circulating feed gas supplied to the adsorption column. In this case, the product recovery rate does not greatly change since the flow of the product gas also increases.

This means that by shortening the cycle time, the amount of adsorbent can be reduced without having to increase the capacity of the compressor.

However, there is a limit to shortening the cycle time. Specifically, when the cycle time is shortened below a threshold value, the increase ratio of the circulating feed gas becomes greater than the increase ratio of the flow of the product, and the product recovery rate decreases.

The cycle time may be determined, according to the characteristic of adsorbent and the component concentration of the circulating feed gas, so that the amount of adsorbent and the capacity of the compressor can be set low without decreasing the product recovery rate.

Also, according to the present invention, as shown by the broken line in FIG. 1, a linking line L14 that connects a line L13 on the exit side of the compressor 2 and the feed gas storage tank 1, may be provided and a part of the circulating feed gas from compressor 2 returned to the feed gas storage tank 1 through this linking line L14.

Also, in step 2 and 4 of the embodiment mentioned above, an example was shown of a method of pressure equalizing by connecting the adsorption column 11 and the adsorption column 21 by the lines L3 and L6. However a line (not shown in the diagram) that connects the adsorption column 11 and the adsorption column 21 may be provided in addition to the lines L3 and L6, and the adsorption column 11 and the adsorption column 21 may be connected by this line.

In the gas separation method of the present embodiment, in step 2, an equalization depressurization step and an equalization pressurization step are carried out in which the gas in the first adsorption column 11 is introduced into the second adsorption column 21, and the adsorption column 11 and the adsorption column 21 are pressure equalized.

During step 2, since the first adsorption column 11 is depressurized, gas containing a large amount of krypton that had been adsorbed onto the first adsorption column 11 is introduced into the second adsorption column 21 together with the circulating feed gas.

Accordingly, the concentration of krypton in the gas introduced into the second adsorption column 21 during step 2 becomes greater than the concentration of krypton in the circulating feed gas.

Also, during step 4, an equalization depressurization step and an equalization pressurization step are carried out in which the gas in the second adsorption column 21 is introduced into the first adsorption column 11, and the adsorption column 11 and the adsorption column 21 are pressure equalized.

During step 4, since the second adsorption column 21 is depressurized, gas containing a large amount of nitrogen that had been adsorbed onto the second adsorption column 21 is introduced into the second adsorption column 21 together with the circulating feed gas.

Accordingly, the concentration of nitrogen in the gas introduced into the first adsorption column 11 during step 4 becomes greater than the concentration of nitrogen in the circulating feed gas.

Thus, during step 2 and 4, by the equalization depressurization step and the equalization pressurization step, gas having a high concentration of an object gas that is to be separated as the product gas (krypton or nitrogen) can be supplied to the adsorption columns 11 and 21.

Therefore, during the adsorption steps following these steps 2 and 4, (steps 1 and 3), more efficient krypton adsorption in the adsorption column 11 and nitrogen adsorption in the adsorption column 21 can be achieved, and the product recovery rate can be improved.

Moreover, since the efficiency of the adsorption of krypton and nitrogen can be improved, the capacity of the compressor 2 can be made smaller. For instance, compared with the conventional method, the capacity of the compressor 2 can be configured to be 5% to 20% smaller.

Therefore, the compressor 2 can be smaller, and space saving can be achieved while facility cost can be kept down.

Furthermore, in this gas separation method, during steps 2 and 4, since the adsorption columns 11 and 21, which are the destinations of introduction of the circulating feed gas, are pressurized by the equalization depressurization step and the equalization pressurization step, dramatic fluctuations in the operation load on the compressor 2 can be prevented, and operation load on the compressor 2 can be reduced.

Therefore, the capacity of the compressor 2 can be configured to be small, and facility cost can be kept down.

Figure 3:
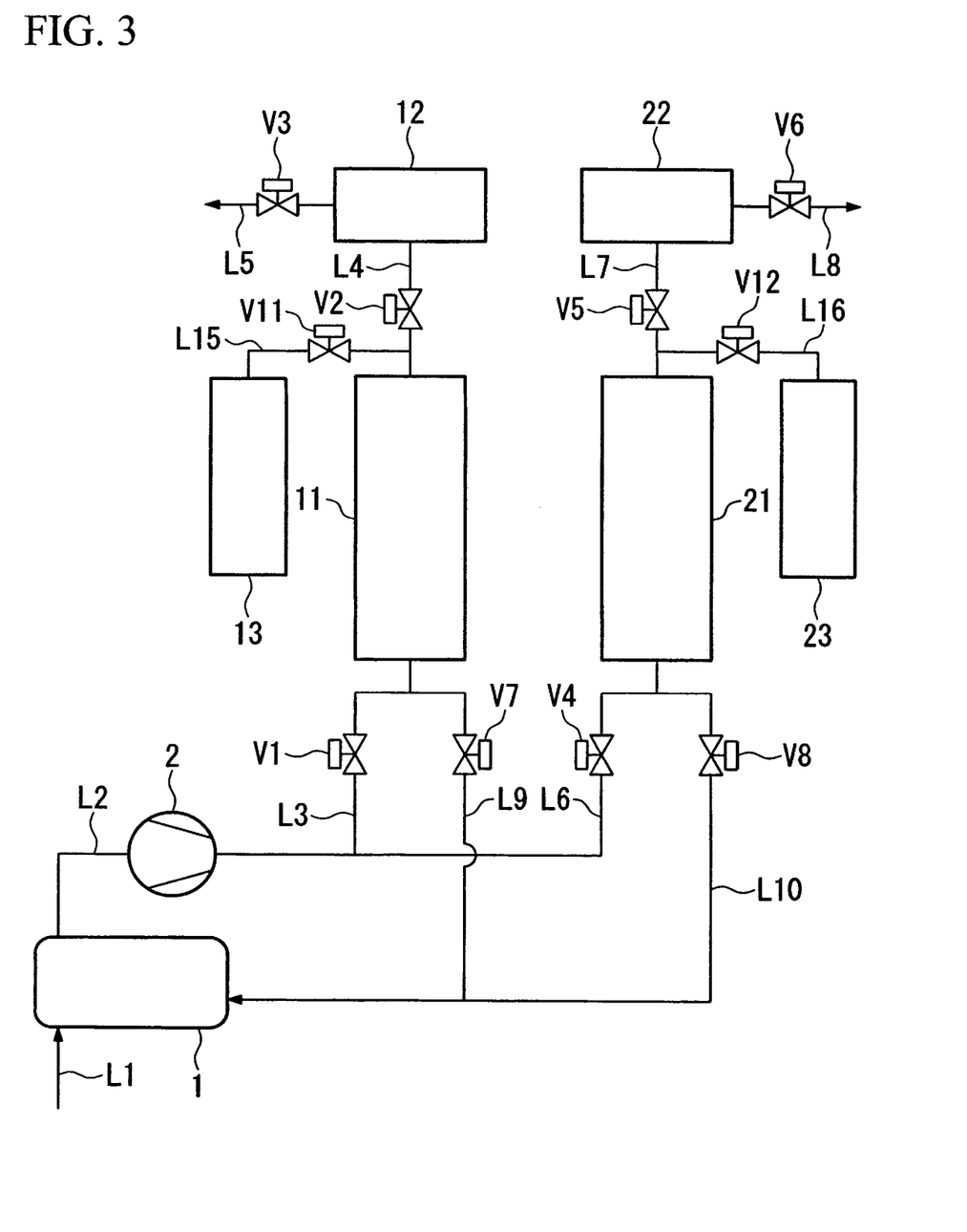
FIG. 3 is a schematic diagram showing a gas separation apparatus that can carry out a second embodiment of the gas separation method of the present invention.

FIG. 3 is a schematic diagram showing a gas separation apparatus that can carry out a second embodiment of the gas separation method of the present invention.

The gas separation apparatus shown here differs from the gas separation apparatus shown in FIG. 1 in that the lines L11 and L12 that introduce nitrogen or krypton from the product gas storage tanks 12 and 22 into the adsorption columns 11 and 21 are not provided, and in that a first and a second purge gas storage tank 13 and 23 that store the gas delivered from the adsorption columns 11 and 12 as purge gas are provided.

The first purge gas storage tank 13 is connected to the line L7 via a line L15, and is made to be able to supply the gas in the tank 13 to the first adsorption column 11 as purge gas via the paths L15 and L4.

The second purge gas storage tank 23 is connected to the line L7 via a line L16, and is made to be able to supply the gas in the tank 23 to the second adsorption column 21 as purge gas via the paths L16 and L7.

Hereinafter, a second embodiment of the gas separation method of the present invention will be explained as an example of the case in which the above mentioned gas separation apparatus is used.

(Step 1)

A feed gas is introduced into the feed gas storage tank 1 via the path L1.

Figure 4A:
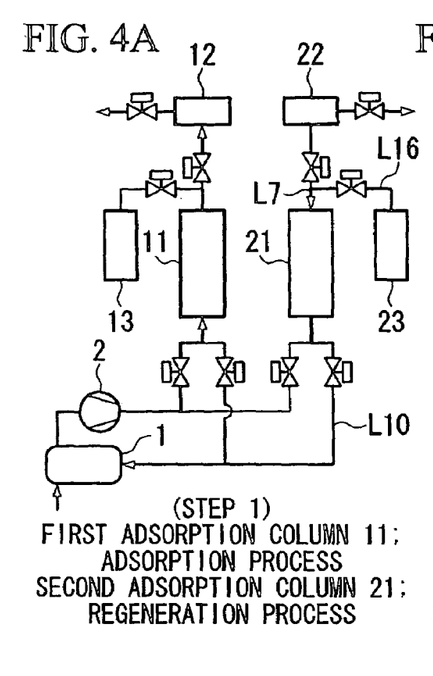
FIG. 4A to D is a flow chart of the second embodiment of the gas separation method of the present invention.

As shown in FIG. 4A, in the first adsorption column 11, an adsorption step is carried out in which the krypton gas in the circulating feed gas is selectively adsorbed and the nitrogen gas passes to the tank 12 and is delivered out of the system as the first product gas.

In the second adsorption column 21, a regeneration step is carried out in which the nitrogen gas is desorbed by depressurization. During this regeneration step, the nitrogen gas that has been adsorbed during the adsorption step carried out before step 1 is desorbed and returned to the feed gas storage tank 1 via the path L10 as discharge gas.

At the same time, purge gas in the second purge gas storage tank 23 is introduced into the second adsorption column 21 via the paths L16 and L7, and this gas is passed through the second adsorption column 21, so that desorption of the nitrogen gas that has been adsorbed onto the second adsorbent is accelerated.

(Step 2)

Figure 4B:
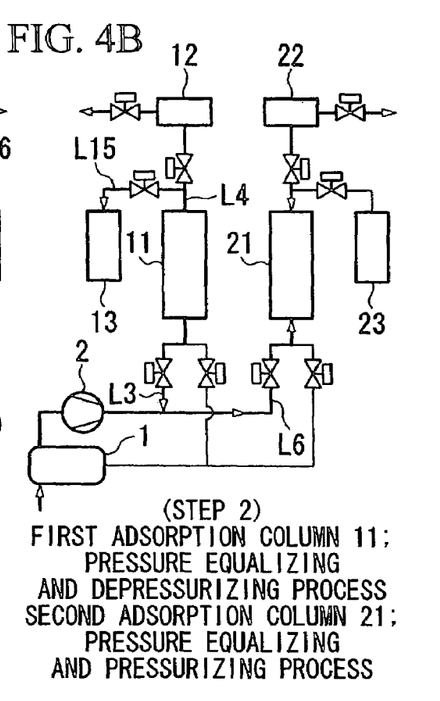

As shown in FIG. 4B, an equalization depressurization step is carried out in which the first adsorption column 11 is depressurized by introducing the gas in the first adsorption column 11 into the second adsorption column 21 via the paths L3 and L6, and equalizing the pressure of the adsorption columns 11 and 21.

At this time, a portion of the gas in the adsorption column 11, (for instance, gas in the upper part of the adsorption column 11), is introduced into the first purge gas storage tank 13 as purge gas via the paths L4 and L15.

In the second adsorption column 21, an equalization pressurization step is carried out in which the second adsorption column 21 is pressurized by pressure equalizing the adsorption columns 11 and 21.

During this equalization pressurization step, the krypton gas in the tank 22 is introduced into the second adsorption column 21, while the gas from the first adsorption column 11 is introduced into the second adsorption column 21. In this way, the second adsorption column 21 is pressurized.

(Step 3)

Figure 4C:
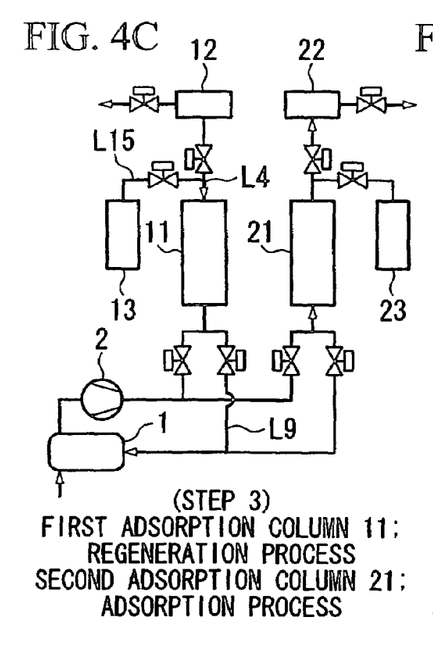

As shown in FIG. 4C, a regeneration step in which krypton gas is desorbed by depressurizing is carried out in the first adsorption column 11. During this regeneration step, the krypton gas that has been adsorbed during step 1 is desorbed and returned to the feed gas storage tank 1 via the path L9 as discharge gas.

At the same time, the purge gas in the first purge gas storage tank 13 is introduced into the first adsorption column 11 via the paths L15 and L4, and this gas is passed through the first adsorption column 11, so that desorption of the krypton gas that has been adsorbed to the first adsorbent is accelerated.

In the second adsorption column 21, an adsorption step is carried out in which the nitrogen in the circulation gas is selectively adsorbed and the krypton gas passes to the tank 22 and is delivered out of the system as the second product gas.

(Step 4)

Figure 4D:
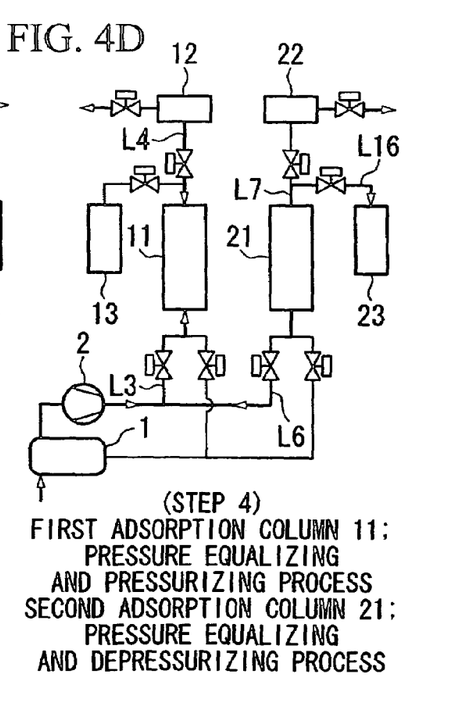

As shown in FIG. 4D, an equalization depressurization step is carried out, in which the second adsorption column 21 is depressurized by introducing the gas in the second adsorption column 21 into the first adsorption column 11 via the paths L6 and L3, equalizing the pressure of the adsorption columns 11 and 21.

At this time, a portion of the gas in the adsorption column 21 (for instance, gas in the gap in the upper part of the adsorption column 21) is introduced into the second purge gas storage tank 23 as purge gas via the paths L7 and L16.

In the first adsorption column 11, an equalization pressurization step is carried out in which the first adsorption column 11 is pressurized by pressure equalizing the adsorption columns 11 and 21.

During this equalization pressurization step, the nitrogen gas in the tank 12 is introduced into the first adsorption column 11 via the path L4, while the gas from the second adsorption column 21 is introduced into the first adsorption column 11. In this way, the first adsorption column 11 is pressurized.

In the gas separation method of the present embodiment, since an equalization depressurization step and an equalization pressurization step, in which the gas in the first adsorption column 11 is introduced into the second adsorption column 21, and the adsorption column 11 and the adsorption column 21 are pressure equalized, are carried out during step 2 and step 4, then as with the method of the first embodiment, an increase in the efficiency of the krypton adsorption in the adsorption column 11 and the nitrogen adsorption in the adsorption column 21 can be achieved during the adsorption steps following these steps 2 and 4 (steps 3 and 1).

Therefore, the product recovery rate can be improved.

Also, the compressor 2 can be smaller, and space saving can be achieved while facility cost can be kept down.

Furthermore, in the gas separation method of the present embodiment, during the regeneration step in step 1 (or step 3), since the purge gas from the purge gas storage tank 23 (or the purge gas storage tank 13) is supplied to the adsorption column 21 (or the adsorption column 11), the product gas in the tank 22 (or the tank 12) does not need to be used as purge gas.

Therefore, the product recovery rate can be further improved.

Moreover, when the gas flow that is introduced into the purge gas storage tank 13 (or the tank 23) during the equalization depressurization step, and the gas flow that is delivered into the adsorption column 11 (or the adsorption column 21) during the regeneration step, are significantly different, a line that connects the purge gas storage tank 13 (or the tank 23) and the adsorption column 11 (or the adsorption column 21) may be provided in addition to the line L15 (or the line L16), and separate lines may be used when introducing and delivering the purge gas (configuration not shown in the diagram).

In the embodiment mentioned above, although a mixed gas containing nitrogen and krypton was the object of separation, the components of the object of separation are not limited to this, and for instance, xenon may be the object of separation instead of krypton.

WORKING EXAMPLES

Working Example 1

Separation of a mixed gas was carried out in the following way using the gas separation apparatus shown in FIG. 1. The specifications of the gas separation apparatus used are shown below.

(1) First Adsorption Column 11

A cylindrical adsorption column with an internal diameter of 43 mm and a length of 700 mm, filled with 0.45 kg of activated carbon (the first adsorbent).

(2) Second Adsorption Column 21

A cylindrical adsorption column with an internal diameter of 70.3 mm and a length of 540 mm, filled with 1.42 kg of zeolite 4A (the second adsorbent).

(3) Compressor 2

Capacity: 4.7 L/min (the flow rate [L/min] is a conversion to a value at 0° C. and 1 atm; the same applies to the following).

A mixed gas consisting of 50% nitrogen (the first component) and 50% krypton (the second component) was used as a feed gas.

The gas separation apparatus mentioned above was operated taking step 1 to step 4 as being one cycle and the operating time for one cycle as being 400 seconds. The duration of each step was as shown in Table 2.

first product gas storage tank 12 via the path L4. The first adsorption column II was pressurized from 180 to 435 kPa (gauge pressure) (adsorption step).

In the second adsorption column 21, the gas in the adsorption column 21 was returned to the feed gas storage tank 1 via the path L10 as discharge gas. As a result, the second adsorption column 21 was depressurized, and the nitrogen that had been adsorbed onto the second adsorbent was desorbed. The second adsorption column 21 was depressurized to be 0 to 10 kPa (gauge pressure).

At the same time, the krypton gas in the second product gas storage tank 22 was introduced into the second adsorption column 21 via the path L12, and the adsorption column 21 was purged (regeneration step).

(Step 2)

As shown in FIG. 1 and FIG. 2B, the valves V2, V8, and V10 were closed and the valves V1, V4, and V5 were opened.

Thus, the first adsorption column 11 and the second adsorption column 21 were connected by the lines L3 and L6, and the gas in the first adsorption column 11 was introduced into the second adsorption column 21 via the paths L3 and L6.

At the same time, the krypton gas was introduced from the second product gas storage tank 22 into the second adsorption column 21 via the path L7.

Thus, the first adsorption column 11 was depressurized to 290 kPa (gauge pressure), and the second adsorption column 21 was pressurized to 260 kPa (gauge pressure) (the equalization depressurization step and equalization pressurization step).

(Step 3)

As shown in FIG. 1 and FIG. 2C, the valves V1, and V5 were closed and the valves V7 and V9 were opened.

In this way, the gas in the first adsorption column 11 was returned to the feed gas storage tank 1 via the path L9 as discharge gas. The first adsorption column 11 was depressurized to be 0 to 10 kPa (gauge pressure).

TABLE 2

|  | Time | | | |
| --- | --- | --- | --- | --- |
|  | 0-195 secs | 195-200 secs | 200-395 secs | 395-400 secs |
| First adsorption column | Adsorption step | Equalization depressurization step | Regeneration step | Equalization pressurization step |
| Second adsorption column | Regeneration step | Equalization pressurization step | Adsorption step | Equalization depressurization step |

(Step 1)

As shown in FIG. 1 and FIG. 2A, valves V1, V3, V6, V8, and V10 were opened and the other valves were closed.

The mixed gas was introduced into the feed gas storage tank 1 at a flow rate of 0.44 L/min, and the circulation gas from this feed gas storage tank 1 was supplied to the first adsorption column 11 via the path L3 at 4.7 L/min using the compressor 2. Also, the concentration of the circulation gas was adjusted to be substantially the same as for the composition of the feed gas.

After the supply of the circulating feed gas was carried out until the pressure of the adsorption column 11 rose above the pressure of the tank 12, the valve V2 was opened and the gas (nitrogen) in the adsorption column 11 was recovered to the At the same time, the nitrogen in the first product gas storage tank 12 was introduced into the first adsorption column 11 via the path L1, and the adsorption column 11 was purged (regeneration step).

In the second adsorption column 21, the circulating feed gas was supplied to the second adsorption column 21 via the path L6.

After the supply of the circulating feed gas was carried out until the pressure of the adsorption column 21 rose above the pressure of the tank 22, the valve V5 was opened and the gas in the adsorption column 21 (krypton gas) was recovered to the second product gas storage tank 22 via the path L7. The second adsorption column 21 was pressurized from 260 to 420 kPa (gauge pressure) (adsorption step).

(Step 4)

As shown in FIG. 1 and FIG. 2D, the valves V7, V9, and V5 were closed and the valves V1, V2, and V4 were opened.

Thus, the first adsorption column 11 and the second adsorption column 21 were connected by the lines L3 and L6, and the gas in the second adsorption column 21 was introduced into the first adsorption column 11 via the paths L3 and L6.

At the same time, the nitrogen gas was introduced from the first product gas storage tank 12 into the first adsorption column 11 via the path L4.

Thus, the pressure of the first adsorption column 11 was raised to 180 kPa (gauge pressure), and the second adsorption column 21 was depressurized to 240 kPa (gauge pressure) (the equalization depressurization step and equalization pressurization step).

By repeating the step 1 to step 4, a first product gas having a nitrogen concentration of 99.5% was recovered to the first product gas storage tank 12, and a second product gas having a krypton gas concentration of 99.995% was recovered to the second product gas storage tank 22.

Table 3 shows the flow rate and product recovery rate of the product gas.

Comparative Example 1

Separation of mixed gas was carried out using a gas separation apparatus having first and second adsorption columns and a compressor that supplies a mixed gas to these adsorption columns.

All test conditions were set in accordance with those of the working example 1, except that the flow rate of the circulating feed gas from the compressor was made to be 5.3 L/min.

As shown in Table 1, in the first and the second adsorption columns, the adsorption step and the regeneration step were alternately carried out so that when one of the adsorption columns was during the adsorption step, the other adsorption column was carrying out the regeneration step.

The product gas flow and the product recovery rate of the product gas in the conditions in which the product nitrogen gas concentration and the product krypton gas concentration are the same as in the working example 1 are shown together in Table 3.

TABLE 3

|  | Product nitrogen gas | | Product krypton gas | |
| --- | --- | --- | --- | --- |
|  | Flow rate (L/min) | Recovery rate (%) | Flow rate (L/min) | Recovery rate (%) |
| Working example 1 | 0.22 | 18.6 | 0.22 | 18.7 |
| Comparative example 1 | 0.22 | 16.5 | 0.22 | 16.6 |

According to Table 3, in the gas separation method of working example 1, it is clear that the product recovery rate has been increased in comparison with the comparative example 1.

Working Example 2

Separation of mixed gas was carried out using the same gas separation apparatus that was used in the working example 1.

This gas separation apparatus was operated with the operating time of one cycle being 600 seconds. The durations of the adsorption step and the regeneration step were 295 seconds respectively, and the durations of the equalization depressurization step and the equalization pressurization step were 5 seconds respectively.

The same mixed gas as that used in the working example 1 was used.

The flow rates of the product nitrogen gas and the product krypton gas were both set to be 0.15 L/min.

The supply flow rate of the circulating feed gas was allowed to change within the range of 2.8 to 4.0 L/min, and the product nitrogen gas concentration and the product krypton gas concentration were measured. Also, pressures during the adsorption step of the first adsorption column 11 and the second adsorption column 21 changed in accordance with the flow rate of the circulating feed gas.

Figure 5:
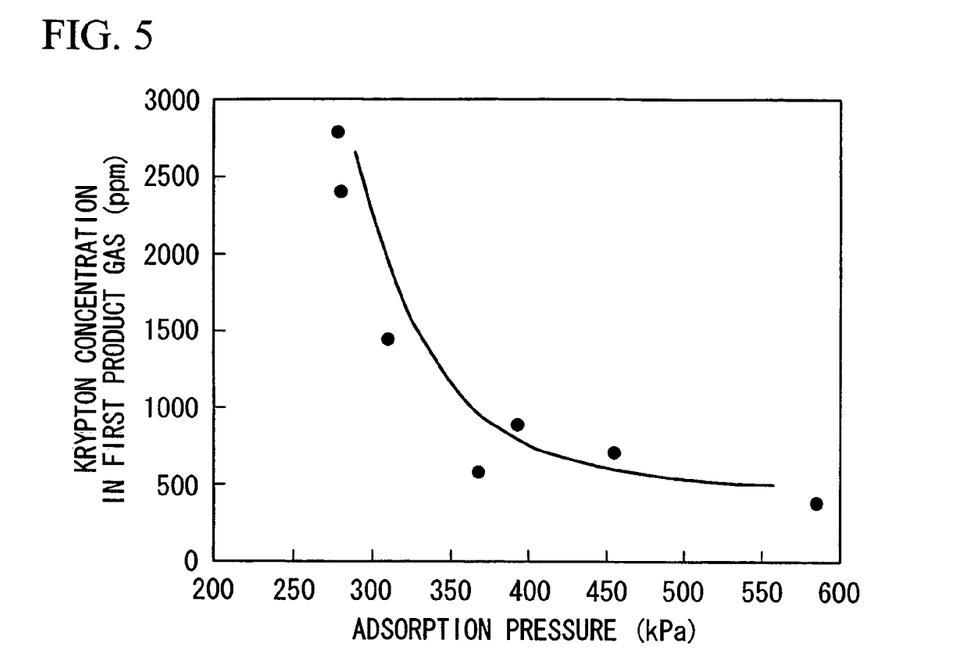
FIG. 5 is a graph showing a test result.

The change in the adsorption pressure of the first adsorption column 11 and the concentration of the krypton gas in the first product gas is shown in FIG. 5.

Figure 6:
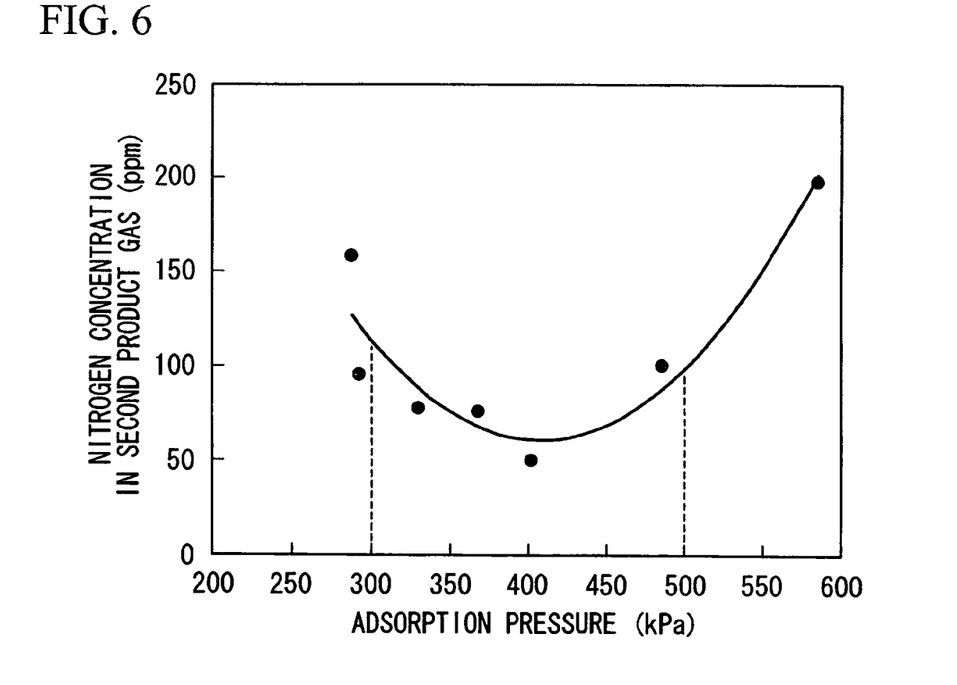
FIG. 6 is a graph showing a test result.

The change in the adsorption pressure of the second adsorption column 21 and the concentration of the nitrogen gas in the second product gas is shown in FIG. 6.

According to FIG. 5, it is clear that the concentration of krypton in the first product gas can be decreased by raising the adsorption pressure in the first adsorption column 11. This tendency is the same as that of a general pressure swing adsorption method.

According to this result, it has been confirmed that increasing the adsorption pressure is effective in order to reduce the amount of adsorbent in pressure swing type adsorption separation in which nitrogen gas is enriched from a mixed gas containing nitrogen and krypton, using activated carbon as an adsorbent.

Correspondingly, as shown in FIG. 6, in the adsorption separation of the second adsorption column 21, the concentration of nitrogen decreases when the adsorption pressure is raised in the range where the adsorption pressure is comparatively low, and conversely, the concentration of nitrogen increases when the adsorption pressure is raised in the range where the adsorption pressure is comparatively high.

For instance, since the concentration of nitrogen rises when the adsorption pressure exceeds 500 kPa (gauge pressure), it leads to an increase in the amount of adsorbent or a decrease in the product recovery rate. According to FIG. 6, it is clear that is preferable for the adsorption pressure to be 300 to 500 kPa (gauge pressure).

The tendency of the concentration of impurities to increase when pressure is raised in the range where the adsorption pressure is comparatively high differs from conventional pressure swing adsorption methods.

From this it is clear that the adsorption pressure needs to be adjusted to the appropriate range for a pressure swing adsorption method that separates krypton from a mixed gas containing nitrogen and krypton using a rate-selective adsorbent such as zeolite 4A.

INDUSTRIAL APPLICABILITY

In the gas separation method of the present invention, the equalization depressurization step and the equalization pressurization step, which pressure equalize the first and the second adsorption columns, are carried out during steps 2 and 4.

Because of this, during these steps, gas containing a high concentration of the object gas that is to be separated as a product gas can be supplied to the adsorption columns.

Therefore, the product recovery rate can be improved by increasing the efficiency of the adsorption of the components during the adsorption steps that follow these steps 2 and 4 (steps 3 and 1).

Moreover, since the product recovery rate can be improved, the capacity of the compressor can be made smaller.

Therefore, the compressor can be made smaller, and space saving can be achieved while facility cost can be kept down.

The invention claimed is:

1. A gas separation method which uses a pressure swing adsorption method to separate from a mixed gas containing at least two components, a first component and a second component, using a first adsorbable column containing a first adsorbent on which said first component is less readily adsorbable and said second component is more readily absorbable, and a second adsorption column containing a second adsorbent on which said first component is more readily adsorbable and said second component is less readily adsorbable, comprising:
   a first step comprising an adsorption step in which in said first adsorption column, said mixed gas is supplied at a high pressure and said second component is selectively adsorbed and said first component is separated as a first product gas, and a regeneration step in which in said second adsorption column, said first component is desorbed by depressurization;
   a second step comprising an equalization depressurization step in which said first adsorption column is depressurized by connecting said first adsorption column and said second adsorption column, and introducing the gas in said first adsorption column into said second adsorption column, to pressure equalize said first and second adsorption columns, and an equalization pressurization step in which said second adsorption column is pressurized to equalize the pressure of said first and second adsorption columns;
   a third step comprising a regeneration step in which in said first adsorption column, said second component is desorbed by depressurization, and an adsorption step in which in said second adsorption column, said mixed gas is supplied at a high pressure, and said first component is selectively adsorbed, and said second component is separated as a second product gas; and
   a fourth step comprising an equalization depressurization step in which said second adsorption column is depressurized by connecting said second adsorption column and said first adsorption column, and introducing the gas in said second adsorption column into said first adsorption column, to pressure equalize said first and second adsorption columns, and an equalization pressurization step in which said first adsorption column is pressurized to equalize the pressure of said first and second adsorption columns,
   wherein a first product gas storage tank that stores said first product gas and a second product gas storage tank that stores said second product gas are used, and in said regeneration step in said first and second adsorption columns, each product gas in said first and the second product gas storage tanks is introduced into said first and the second adsorption columns respectively, and
   in said equalization pressurization step in said first and second adsorption columns, each product gas in said first and the second product gas storage tanks is introduced into said first and second adsorption columns respectively.

2. A gas separation method according to claim 1, wherein one of said first and second components is krypton or xenon, and the other one is nitrogen.

3. A gas separation method according to claim 1, wherein one of said first and second adsorbents is an equilibrium type adsorbent, and the other one is a rate-selective adsorbent.

4. A gas separation method according to claim 1, wherein one of said first and second adsorbents is activated carbon, and the other one is zeolite.

5. A gas separation method according to claim 3, wherein in the adsorption column having said rate-selective adsorbent, a maximum pressure reached in said adsorption step is 300 to 500 kPa (gauge pressure).

6. A gas separation method which uses a pressure swing adsorption method to separate from a mixed gas containing at least two components, a first component and a second component, using a first adsorption column containing a first adsorbent on which said first component is less readily adsorbable and said second component is more readily absorbable, and a second adsorption column containing a second adsorbent on which said first component is more readily adsorbable and said second component is less readily adsorbable, comprising:
   a first step comprising an adsorption step in which in said first adsorption column, said mixed gas is supplied at a high pressure and said second component is selectively adsorbed and said first component is separated as a first product gas, and a regeneration step in which in said second adsorption column, said first component is desorbed by depressurization;
   a second step comprising an equalization depressurization step in which said first adsorption column is depressurized by connecting said first adsorption column and said second adsorption column, and introducing the gas in said first adsorption column into said second adsorption column, to pressure equalize said first and second adsorption columns, and an equalization pressurization step in which said second adsorption column is pressurized to equalize the pressure of said first and second adsorption columns;
   a third step comprising a regeneration step in which in said first adsorption column, said second component is desorbed by depressurization, and an adsorption step in which in said second adsorption column, said mixed gas is supplied at a high pressure, and said first component is selectively adsorbed, and said second component is separated as a second product gas; and
   a fourth step comprising an equalization depressurization step in which said second adsorption column is depressurized by connecting said second adsorption column and said first adsorption column, and introducing the gas in said second adsorption column into said first adsorption column, to pressure equalize said first and second adsorption columns, and an equalization pressurization step in which said first adsorption column is pressurized to equalize the pressure of said first and second adsorption columns,
   wherein in said equalization depressurization step in said first and second adsorption columns, the gas in said first and the second adsorption columns is stored into first and second purge gas storage tanks respectively as purge gas; and
   in said regeneration step in said first and second adsorption columns, the purge gas in said first and second purge gas storage tanks is introduced into said first and second adsorption columns respectively.

* * * * *